(12) United States Patent
Ilg et al.

(10) Patent No.: US 12,712,255 B2
(45) Date of Patent: Aug. 18, 2026

(54) FILL LEVEL SENSOR ARRANGEMENT WITH HEAT INSULATION

(71) Applicant: VEGA Grieshaber KG, Wolfach (DE)

(72) Inventors: Thomas Ilg, Haslach (DE); Tobias Bader, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 330 days.

(21) Appl. No.: 18/531,013

(22) Filed: Dec. 6, 2023

(65) Prior Publication Data

US 2024/0186678 A1 Jun. 6, 2024

(30) Foreign Application Priority Data

Dec. 6, 2022 (DE) ..................... 10 2022 213 160.6

(51) Int. Cl.
*H01Q 1/22* (2006.01)
*G01F 23/80* (2022.01)
(Continued)

(52) U.S. Cl.
CPC ........... *H01Q 1/225* (2013.01); *G01F 23/802* (2022.01); *H01B 17/265* (2013.01); *H01B 17/58* (2013.01);
(Continued)

(58) Field of Classification Search
CPC ...... G01F 23/284; G01F 23/802; H01P 1/042; H01P 1/264; H01P 1/213; G01S 13/88; G01S 7/027; G01S 7/03
See application file for complete search history.

(56) References Cited

U.S. PATENT DOCUMENTS 11,085,807 B2 8/2021 Kienzle et al.
11,594,799 B2 2/2023 Kienzle et al.
(Continued)

FOREIGN PATENT DOCUMENTS

CN 111 463 538 A 7/2020
CN 113383213 A * 9/2021 ............. H01Q 1/225
(Continued)

OTHER PUBLICATIONS

German Office Action issued Aug. 29, 2023 in German Patent Application No. 10 2022 213 160.6, 6 pages.
(Continued)

*Primary Examiner* — Andre J Allen
(74) *Attorney, Agent, or Firm* — Oblon, McClelland, Maier & Neustadt, L.L.P.

(57) ABSTRACT

A sensor arrangement which is configured for measuring a filling level, a limit level and/or a pressure and has an antenna for transmitting and/or receiving a measurement signal, a waveguide with a first waveguide section for connection to the antenna and a second waveguide section, configured for transmitting the measurement signal, and a heat insulating element. The heat insulating element is arranged between the first and second waveguide sections and is arranged to at least partially prevent heat conduction between the first and second waveguide sections. The invention further relates to a heat insulating element for a sensor arrangement, the use of a heat insulating element for heat insulation of electronics of a level, limit level and/or pressure measuring device and the use of a sensor arrangement in a process plant.

10 Claims, 1 Drawing Sheet

(51) Int. Cl.
*H01B 17/26* (2006.01)
*H01B 17/58* (2006.01)
*H01B 17/62* (2006.01)
*H01Q 13/02* (2006.01)

(52) U.S. Cl.
CPC ......... *H01B 17/62* (2013.01); *H01Q 13/0275* (2013.01)

(56) References Cited

U.S. PATENT DOCUMENTS

| | | | | |
|---|---|---|---|---|
| 2007/0028829 | A1 | 2/2007 | Griessbaum et al. | |
| 2007/0115196 | A1 | 5/2007 | Motzer et al. | |
| 2007/0188396 | A1 | 8/2007 | Griessbaum et al. | |
| 2010/0123615 | A1* | 5/2010 | Fehrenbach | H01Q 19/08 342/124 |
| 2015/0346016 | A1 | 12/2015 | Klofer et al. | |
| 2022/0074783 | A1 | 3/2022 | Larsson | |

FOREIGN PATENT DOCUMENTS

| | | | | | |
|---|---|---|---|---|---|
| CN | 116547556 | A | * | 8/2023 | G01F 23/284 |
| DE | 198 17 430 | A1 | | 10/1999 | |
| DE | 103 17 793 | A1 | | 12/2004 | |
| DE | 10 2005 036 715 | A1 | | 2/2007 | |
| DE | 10 2005 036 844 | A1 | | 2/2007 | |
| DE | 10 2005 056 042 | A1 | | 5/2007 | |
| DE | 10 2014 107 781 | A1 | | 12/2015 | |
| DE | 102022119383 | A1 | * | 2/2024 | G01D 11/245 |
| EP | 0 376 401 | B1 | | 1/1995 | |
| EP | 3 483 569 | B1 | | 8/2021 | |
| TW | M658015 | U | * | 7/2024 | H01Q 1/243 |

OTHER PUBLICATIONS

European Search Report issued Apr. 24, 2024 in corresponding Patent Application No. 23212572.4, 8 pages.

* cited by examiner

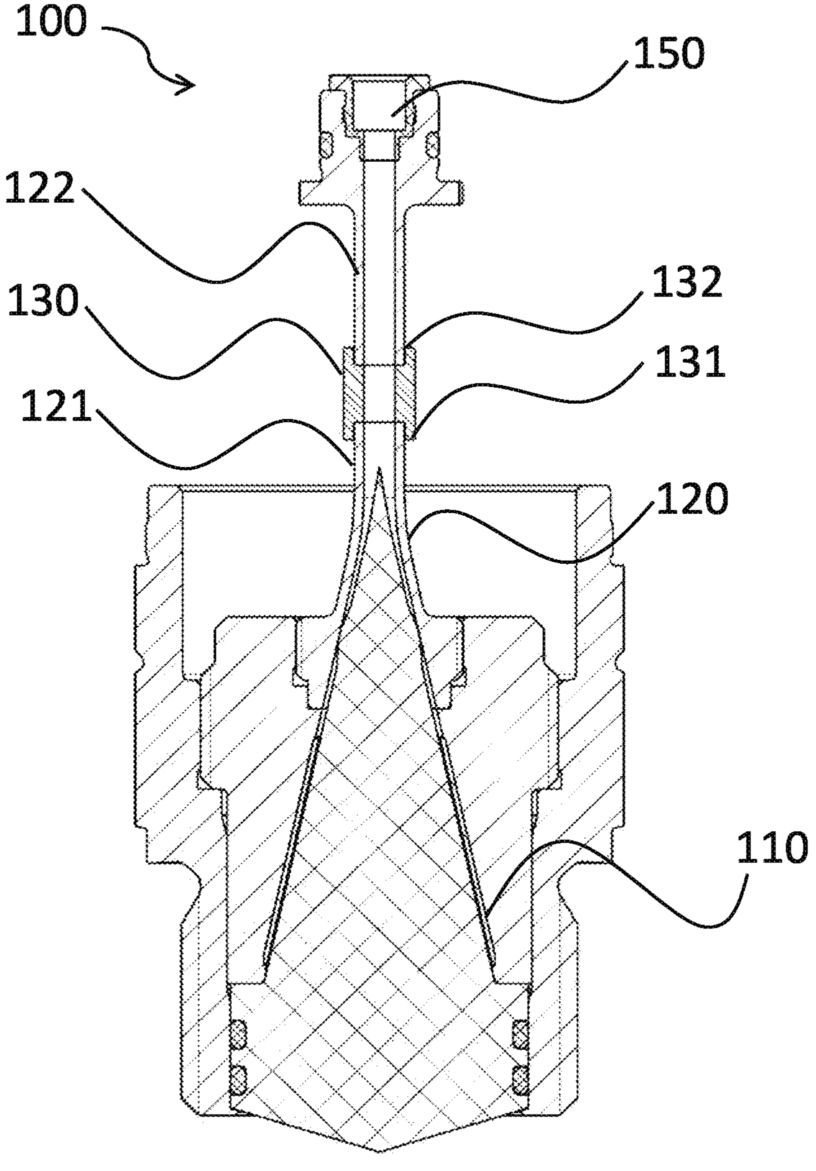
100
150
122
132
130
131
121
120
110

FILL LEVEL SENSOR ARRANGEMENT WITH HEAT INSULATION

CROSS-REFERENCE TO RELATED APPLICATIONS

This application claims the benefit of the filing date of German Patent Application No. 10 2022 213 160.6 filed on 6 Dec. 2022, the entire content of which is incorporated herein by reference.

FIELD

Described is a sensor arrangement for measuring a filling level, a limit level and/or a pressure, a heat insulation element for a sensor arrangement, the use of a heat insulation element for heat insulation of electronics with a radar chip of a filling level, limit level and/or pressure measuring device and the use of a sensor arrangement for filling level, limit level and/or pressure measurement in a process plant.

TECHNICAL BACKGROUND

In modern process plants, many field devices or measuring devices are installed in a stationary and distributed manner in order to record measurement, parameterization and diagnostic data. The field devices are often used outdoors or in demanding environments, for example with a high operating temperature. Such field devices have a waveguide, for example, with which a measuring beam can be transmitted from the measuring electronics to an antenna or vice versa. The reliability and stability of the field devices are of great importance for their use over a long period of time.

SUMMARY

There may be a desire to provide a flexible and robust measuring sensor in a process system.

This desire may be met by the subject-matter of the independent patent claim. Further embodiments of the present disclosure are shown in the subclaims and the following description.

An aspect of the present disclosure relates to a sensor arrangement which is configured to measure a filling level, a limit level and/or a pressure and has an antenna which is configured to transmit and/or receive a measurement signal, a waveguide, such as a hollow conductor, and a heat or thermal insulating element. The waveguide has a first waveguide section for connection to the antenna and a second waveguide section and is configured to transmit the measurement signal. The second waveguide section can, for example, be configured for connection to a high-frequency electronics unit.

The heat insulation element can serve as a connecting element for the waveguide sections for thermal insulation or for reducing a passage of thermal energy from one waveguide section to the other waveguide section. Therefore, the heat insulation element may have a greater thermal resistance or a greater thermal resistivity than the waveguide or the first waveguide section and the second waveguide section.

The heat insulating element is arranged between the first waveguide section and the second waveguide section and is designed to at least partially prevent heat conduction between the first waveguide section and the second waveguide section.

The sensor arrangement may be a radar sensor arrangement. For example, the sensor arrangement can have a radar sensor, which can be a level, limit level and/or pressure sensor.

The level, limit level and/or pressure sensor can also have an external, wired power supply that can be electrically connected to the electronics in order to provide the energy required to operate the sensor arrangement. Alternatively, the sensor arrangement can have a self-sufficient radar sensor, which can have an internal energy supply, such as a battery, a rechargeable battery, an energy harvesting system or a solar cell.

According to an embodiment, the antenna of the sensor arrangement is a horn antenna or a parabolic antenna.

For example, as a radar antenna, the antenna can be a metallic antenna or a plastic antenna, the inside of which can be metallized. In addition, the antenna can be connected to the waveguide or the waveguide. For example, the antenna can be integral or integrated with the first waveguide section.

The first waveguide section, which can be a lower waveguide section, can be a tubular waveguide section, for example. And the second waveguide section, which can be a waveguide upper part, can also be a tubular section, for example. The first or second tubular waveguide section may have a circular or rectangular cross-section, for example for transmitting the measurement signal at a frequency of 240 GHz. It is therefore possible that the waveguide for the radar sensor can be interrupted, so that the heat insulating element or the heat insulator can be arranged in the meantime.

The first waveguide section can have the same inner diameter and possibly the same outer circumference as the second waveguide section. Alternatively, the first waveguide section can have a different outer circumference than the second waveguide section, whereby the inner diameters of the first and second waveguide sections can be kept the same size.

For example, the waveguide can be made of a metal, such as copper or stainless steel. In particular, the first waveguide section can be made of the same metal as the second waveguide section and/or the antenna.

With the same inner diameter and the same material or metal of the antenna and the waveguide with the first and second waveguide sections, the sensor arrangement can be designed in such a way that the measurement signal or the radar signal can be transmitted without interference and without interruption at the transition points.

According to an embodiment, the heat insulating element can be tubular.

For example, the tubular thermal insulation element can have a circular profile or a rectangular profile for a measurement signal with a frequency of 240 GHz.

According to a further embodiment, the heat insulating element has an inner wall that is at least partially metallized.

The inner wall of the heat insulating element can be designed as a bore or a feedthrough and can be set up to transmit the measurement signal between the first and second waveguide sections. The metallization of the inner wall can thus serve to optimally transmit the measurement signal, in particular if the inner wall can be metallized with the same metal as that of the first and second waveguide sections and/or the antenna. The inner wall transitions between the first waveguide section and the heat insulating element and between the heat insulating element and the second waveguide section can be designed without step formation, continuous and gap-free.

According to a further embodiment, the heat-insulating element consists of a heat-insulating material.

By means of the heat-insulating material, the heat-insulating element can be set up in such a way as to prevent the heat from being drawn up to or reaching another component of the sensor arrangement, for example electronics of the sensor arrangement, in particular if a radar chip can be provided on the electronics of the sensor arrangement.

According to a further embodiment, the heat-insulating material is a plastic or ceramic.

According to a further embodiment, the thermally insulating material is the plastic PEEK or the ceramic is a silicate ceramic or a zirconium oxide (ZrO) ceramic.

The thermally insulating material can have a lower thermal conductivity than the metallic waveguide. For example, the copper waveguide can have a conductivity of 401 W/(m·K) or a stainless steel waveguide can have a conductivity of 15 W/(m·K). The high-temperature-resistant thermoplastic polyether ether ketone (PEEK) as the heat-insulating material has a conductivity of 0.25 W/(m·K) and can be provided with a copper or stainless steel waveguide to prevent the heat transfer of the sensor arrangement. A zirconium oxide (ZrO) ceramic with a thermal conductivity of 2 W/(m·K) may also be suitable for the copper or stainless steel waveguide. In contrast, an aluminum oxide (Al $O_{23}$) ceramic with a thermal conductivity of 30 W/(m·K) can be a suitable thermal insulating material for the copper waveguide, but not for the stainless steel waveguide.

According to a further embodiment, the thermal insulating element of the sensor arrangement has a first insulating element section adapted to receive the first waveguide section and a second insulating element section adapted to receive the second waveguide section. The heat insulating element is adapted to allow a temperature of the sensor arrangement to be lowered along the length of the heat insulating element between the first insulating element section and the second insulating element section.

The first insulating element section can have a first passage with a first recess, which can have a larger diameter than the bore of the thermal insulating element. The diameter of the first passage can be larger than the outer circumference of the first waveguide section in order to accommodate the first waveguide section during connection. A first abutment surface can be provided between the first passage of the first insulating element section and the inner wall of the thermal insulating element, against which the first waveguide section can abut, wherein the first abutment surface can correspond, for example, to the end face of the first waveguide section. It may be provided that the first stop surface can be perpendicular to the inner wall.

The second insulating element section can have a second passage with a second recess, which can have a larger diameter than the bore of the thermal insulating element. The diameter of the second passage can be larger than the outer circumference of the second waveguide section in order to accommodate the second waveguide section during connection. A second abutment surface can be provided between the second passage of the second insulating element section and the inner wall of the thermal insulating element, against which the second waveguide section can abut, wherein the second abutment surface can correspond, for example, to the end face of the second waveguide section. It may be possible for the second stop surface to be perpendicular to the inner wall.

The first passage and the second passage can have the same diameter or different diameters, depending on whether the first waveguide section and the second waveguide section can have the same outer circumference or different outer circumferences.

The inner wall of the heat insulating element can be the inner wall along the entire heat insulating element, i.e., the inner wall can comprise the inner wall of the first heat insulating element, the first stop surface, the wall of the bore, the second stop surface and the inner wall of the second heat insulating element. The inner wall of the thermal insulation element can be completely or fully metallized. Alternatively, the inner wall of the thermal insulation element can be partially metallized. In other words, only the wall of the bore can be metallized, for example, so that the inner wall of the heat insulating element can form a continuous or gap-free inner wall of the sensor arrangement together with the inner wall of the waveguide after connection in order to transmit the measurement signal without interference.

According to a further embodiment, the heat insulating element is set up to transmit the measurement signal within the heat insulating element with the inner wall between the first waveguide section and the second waveguide section of the waveguide.

To ensure that the thermal conductivity of the thermal insulation element can also be kept very low by the metallization, the metallization can only be applied in the tenth or hundredth range, e.g., with a coating thickness of 0.1 to 0.001 mm. For example, the bore of the thermal insulation element can have a diameter of 2.6 mm. In order to metallize the inner wall or the bore, the heat insulating element can have a length of less than 5 mm, for example. The metallization or coating of the bore in the thermal insulation element can advantageously make it possible to obtain a good or optimum radar signal for the sensor arrangement.

According to a further embodiment, the heat insulating element further comprises a connecting element which is adapted to fasten the heat insulating element to the first waveguide section and/or the second waveguide section.

According to a further embodiment, the connecting element is a spring connection or a snap connection.

For example, the connecting element can be used to press the waveguide with the first and second waveguide sections and the thermal insulation element together using a spring-on-block connection system, so that no gap can form between the waveguide and the thermal insulation element.

Thus, the heat insulating element can be integrated into the waveguide and form a waveguide arrangement with the waveguide or the first and second waveguide sections, which can, for example, consist of two materials, namely a plastic or a ceramic as a heat-insulating material and a metal for the waveguide and the metallization of the inner wall of the heat insulating element.

According to a further embodiment, the inner wall of the heat insulating element corresponds to the inner wall of the waveguide when the first waveguide section is connected to the first insulating element section and/or when the second waveguide section is connected to the second insulating element section.

This means that the measurement signal can be guided or transmitted within the sensor arrangement through the first and second waveguide sections of the waveguide and the thermal insulation element in a continuous, step-free and interference-free manner.

According to a further embodiment, the sensor arrangement also has measurement electronics with a radar chip, which is connected to the second waveguide section of the waveguide and is set up to generate a measurement signal and/or to evaluate a measurement signal from the antenna.

For example, the radar chip can be a high-frequency (HF) radar chip, for example with an operating frequency of 80 GHz or higher.

For example, the waveguide made of stainless steel can have a thin wall to reduce the thermal conductivity. However, it may be necessary for the wall of the waveguide to be a minimum wall with a minimum thickness so that the waveguide can be manufactured.

Without the provision of a thermal insulator, the waveguide, which can be made of a metal, for example, can have a minimum length in order to allow the temperature or the heat of the sensor arrangement, starting from the antenna or the first waveguide section on which the antenna can be arranged, to be lowered at the second waveguide section to such an extent that the measurement electronics, which can be arranged on the second waveguide section facing away from the antenna, cannot be damaged. If it is a plastic or ceramic waveguide, for example, the waveguide with a bore of 2.6 mm should be coated to a depth greater than 5 mm for a measurement signal with a frequency of 80 GHz. The metallization of such a waveguide requires a great deal of technical effort and the waveguide can be manufactured, for example, by metallizing two waveguide half-shells and then assembling them to form the bore. It can be a major technical challenge for the sensor arrangement with this waveguide to ensure that the measurement beam can be transmitted from the measurement electronics to the antenna or vice versa after the two waveguide half-shells have been assembled without being influenced by the gap along the waveguide.

In contrast, the sensor arrangement with the heat insulator or the heat insulating element can advantageously prevent or interrupt the heat conduction or heat propagation from the first waveguide section via the second waveguide section to the measurement electronics and/or the radar chip at least partially in order to protect the measurement electronics and/or the radar chip from the heat and the high process temperature. For example, the RF radar chip and the measurement electronics can only be loaded with a temperature of up to 85° C. If a process temperature reaches a high temperature of 130° C. or higher, the provision of the thermal insulation element can advantageously enable the sensor arrangement to be built compactly during use, so that the temperature of the sensor arrangement can be reduced from the high process temperature of 130° C. to a temperature below 85° C. with the aid of the thermal insulation element. In other words, the sensor arrangement with the antenna, the waveguide and the thermal insulation element can have a short and compact design so that the heat conduction between the first waveguide section and the second waveguide section can be significantly interrupted or prevented and the measuring electrode and the radar chip can thus be protected from the high process temperature. The sensor arrangement can therefore be used robustly and stably over a long period of time in a process plant with the high process temperature.

If the sensor arrangement can have a self-sufficient radar sensor, the self-sufficient sensor arrangement can, for example, be set up for wireless communication of the measurement electronics or the radar chip with an external receiver unit, an external evaluation unit or a cloud system, for example for data transmission. Compared to wired communication, in which the energy required for measurement is always in use, battery-operated sensors for monitoring level, limit level or pressure values may become increasingly important with the availability of more advanced, energy-saving wireless technologies. There are particular advantages for applications in the field of process automation in industrial or private environments, such as logistics.

The term "process automation in an industrial or private environment" can be understood as a branch of technology that includes all measures for the operation of machines and systems without the involvement of humans. One aim of process automation is to automate the interaction of individual components of a plant in the chemical, food, pharmaceutical, petroleum, paper, cement, shipping or mining industries. A variety of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as fill level, limit level, flow rate, pressure or density can be monitored and settings for the entire plant can be changed manually or automatically.

One area of process automation in the industrial environment is logistics automation. Distance and angle sensors are used in logistics automation to automate processes within a building or within an individual logistics system. Typical applications for logistics automation systems include baggage and freight handling at airports, traffic monitoring (toll systems), retail, parcel distribution and building security (access control). What is meant by the examples listed above is that presence detection in combination with precise measurement of the size and position of an object is required by the respective application. Sensors based on optical measurement methods using lasers, LEDs, 2D cameras or 3D cameras, which detect distances according to the time-of-flight (ToF) principle, can be used for this purpose.

Another area of process automation in the industrial environment is factory/production automation. Applications for this can be found in a wide variety of sectors such as automotive manufacturing, food production, the pharmaceutical industry or in the packaging sector in general. The aim of factory automation is to automate the production of goods using machines, production lines and/or robots, i.e., to run them without human intervention. The sensors used here and the specific requirements in terms of measuring accuracy when detecting the position and size of an object are comparable to those in the previous example of logistics automation.

For example, the continuous, automated monitoring of fill levels in mobile containers and the preferably wireless transmission of the values to a central evaluation point in the area of goods logistics can be used to easily implement cross-location inventory management. Using the recorded data, significant cost reductions can be achieved depending on the problem in question, for example if the route for delivery vehicles to supply replenishments can be optimized.

A further aspect of the present disclosure relates to a heat insulating element for a sensor arrangement with an antenna and a waveguide, which has a first insulating element section and a second insulating element section. The first insulating element section is designed to accommodate a first waveguide section of the waveguide. The second insulating element section is designed to accommodate a second waveguide section of the waveguide. The heat insulating element is adapted to at least partially prevent heat conduction between the first waveguide section and the second waveguide section.

A further aspect of the present disclosure relates to the use of a heat insulation element for the thermal insulation of electronics with a radar chip of a level, limit level and/or pressure measuring device.

A further aspect of the present disclosure relates to the use of a sensor arrangement for level, limit level and/or pressure measurement in a process plant.

Further embodiments are described below. If the same reference signs are given in the following FIGURES, these denote the same or similar elements. The illustrations in the figures are schematic and not to scale.

BRIEF DESCRIPTION OF THE FIGURES

FIG. 1 shows a sensor arrangement according to an embodiment.

DETAILED DESCRIPTION OF EMBODIMENTS

FIG. 1 shows a sensor arrangement 100 which is configured to measure a filling level, a limit level and/or a pressure and has an antenna 110, a waveguide 120, a heat insulating element 130 and an electronic measuring system 150 with a radar chip.

The antenna 100 can be a horn antenna or a parabolic antenna and can be configured to transmit and/or receive a measurement signal.

The waveguide 120 can have a first waveguide section 121, which can be configured for connection to the antenna 110, and a second waveguide section 122, which can be configured for connection to the measurement electronics 150 or a high-frequency electronics unit. The waveguide 120 can be configured to transmit the measurement signal from the measurement electronics 150 in the direction of the antenna 110 or vice versa.

For example, the waveguide 120 can be made of a metal, such as copper or stainless steel.

The heat insulating element 130 is arranged between the first waveguide section 121 and the second waveguide section 122 and may be arranged to at least partially prevent heat conduction between the first waveguide section 121 and the second waveguide section 122.

The heat-insulating element 130 can be made of a heat-insulating material, which can be a plastic or a ceramic. For example, the heat-insulating material of the heat-insulating element 130 may be a plastic PEEK or a ceramic such as a silicate ceramic or a zirconium oxide (ZrO) ceramic.

It may be necessary for the thermally insulating material to have a lower thermal conductivity than the metallic waveguide 120. For example, the copper waveguide 120 may have a conductivity of 401 W/(m·K) or a stainless steel waveguide 120 may have a conductivity of 15 W/(m·K). The high-temperature-resistant thermoplastic PEEK as the heat-insulating material has a conductivity of 0.25 W/(m·K) and can be provided to prevent the heat transport of the sensor arrangement 100 with a waveguide 120 made of copper or the stainless steel. A zirconia (ZrO) ceramic with a thermal conductivity of 2 W/(m·K) may also be suitable for the copper or stainless steel waveguide. In contrast, an aluminum oxide ($Al\ O_{23}$) ceramic with a thermal conductivity of 30 W/(m·K) can be a suitable thermal insulating material for the copper waveguide, but not for the stainless steel waveguide.

The heat insulating element 130 can be tubular in shape. For example, the heat insulating element 130 can have a recess or a bore in order to form a round or rectangular feedthrough in the heat insulating element 130. For example, the hole for an RF radar chip with an operating frequency of 80 GHz may have a diameter of 2.6 mm.

In addition, the heat insulating element 130 can have an inner wall, which can be at least partially metallized. Alternatively, the heat insulating element 130 can also be completely metallized. Preferably, the metallization can be applied only in the tenth or hundredth range, such as with a coating thickness of 0.1 to 0.001 mm, whereby the thermal conductivity of the heat insulating element 130 after metallization can also be low. In this way, heat conduction or heat transport in the direction of the measurement electronics 150 can be effectively prevented and the radar signal can be routed without interference and continuously at the same time.

The thermal insulating member 130 may include a first insulating member portion 131 having a first passageway at a first end of the thermal insulating member 130 and a second insulating member portion 132 having a second passageway at an opposite second end of the thermal insulating member 130, wherein the first insulating member portion 131 may be adapted to receive the first waveguide section 121 and the second insulating member portion 132 may be adapted to receive the second waveguide section 122.

The heat insulating element 130 is configured to allow a temperature of the sensor arrangement to be lowered along the length of the heat insulating element 130 between the first insulating element section 131 and the second insulating element section 132. For example, the radar chip, which can be an RF radar chip, and the measurement electronics can only be subjected to a temperature of up to 85° C. If a process temperature reaches a high temperature of 130° C. or higher, the provision of the thermal insulation element 130 can advantageously enable the sensor arrangement 100 to be built compactly during use, so that the temperature of the sensor arrangement 100 can be reduced from the high process temperature to a temperature below 85° C. in a short design with the aid of the thermal insulation element.

The first passage of the first insulating element section 131 may have a larger diameter than the bore of the thermal insulating element 130, while the second passage of the second insulating element section 132 may have a larger diameter than the bore of the thermal insulating element 130. A first abutment surface can be provided between the first passage of the first insulating element section 131 and the inner wall of the heat insulating element 130, against which the first waveguide section 121 can abut, wherein the first abutment surface can, for example, correspond to the end face of the first waveguide section 121. The first stop surface can be perpendicular to the inner wall. A second abutment surface can be provided between the second passage of the second insulating element section 132 and the inner wall of the heat insulating element 130, against which the second waveguide section 122 can abut, wherein the second abutment surface can, for example, correspond to the end face of the second waveguide section 122. The second abutment surface may be perpendicular to the inner wall. The first passage and the second passage may have the same diameter, as shown in FIG. 1, or different diameters, depending on whether the first waveguide section 121 and the second waveguide section 122 may have the same outer circumference or different outer circumferences.

The heat insulating element 130 may further comprise a connecting element, which may be arranged to fasten the heat insulating element 130 to the first waveguide section 121 and/or the second waveguide section 122. The connecting element can, for example, be a spring connection or a snap connection.

For example, by means of the connecting element, the waveguide with the first and second waveguide sections and the thermal insulation element can be pressed together by a spring-on-block connection system, so that no gap can occur between the waveguide 120 and the thermal insulation element 130.

Furthermore, the heat insulating element 130 can be set up to transmit the measurement signal within the heat insulating element 130 with the inner wall between the first waveguide section 121 and the second waveguide section 122 of the waveguide. Because the inner wall of the heat insulating element 130 can be metallized, the measurement signal or the measurement beam can be guided from the measurement electronics or the radar chip of the measurement electronics to the antenna 110 or vice versa via the first waveguide section 121, the heat insulating element 130 and the second waveguide section 122.

The inner wall of the heat insulating element 130 can correspond to the inner wall of the waveguide 120 when the first waveguide section 121 is connected to the first insulating element section and/or when the second waveguide section 122 is connected to the second insulating element section 132. Thus, the transition between the inner wall of the heat insulating element 130 and the inner wall of the waveguide 120 or the first waveguide section 121 and/or the second waveguide section can be formed without a gap, so that the measurement signal or the radar signal can be transmitted continuously within the sensor arrangement 100 without influence.

Furthermore, the heat insulating element 130 may be integrated into the waveguide 120 and form a waveguide arrangement with the waveguide 120 or the first and second waveguide sections 121, 122, which may comprise two materials, namely a plastic or a ceramic as a heat insulating material and a metal for the waveguide 120 and the metallization of the inner wall of the heat insulating element 130.

Furthermore, the antenna 110 may be integral or integrated with the waveguide 120 or the first waveguide section 121.

In addition, it should be noted that "comprising" and "having" do not exclude other elements or steps and the indefinite articles "a" or "an" do not exclude a plurality. It should also be noted that features or steps described with reference to one of the above embodiments may also be used in combination with other features or steps of other embodiments described above. Reference signs in the claims are not to be regarded as limitations.

The invention claimed is:

1. A sensor arrangement configured to measure a filling level, a limit level, and/or a pressure, comprising:

an antenna configured to transmit and/or receive a measurement signal;

a waveguide having a first waveguide section for connection to the antenna and a second waveguide section and configured to transmit the measurement signal; and a heat insulator arranged between the first waveguide section and the second waveguide section and configured to at least partially prevent heat conduction between the first waveguide section and the second waveguide section, wherein the heat insulator is tubular in shape and consists of a heat-insulating material, wherein the heat insulator has an inner wall which is at least partially metallized, and wherein the inner wall of the heat insulator corresponds to an inner wall of the waveguide when the first waveguide section is connected to the first insulator and/or when the second waveguide section is connected to a second insulator.

2. The sensor arrangement according to claim 1, wherein the antenna is a horn antenna or a parabolic antenna.

3. The sensor arrangement according to claim 1, where the heat-insulating material is a plastic or ceramic.

4. The sensor arrangement according to claim 3, wherein the plastic is polyether ether ketone (PEEK), or wherein the ceramic is a silicate ceramic or a zirconium oxide ceramic.

5. The sensor arrangement according to claim 1, wherein the heat insulator includes a first insulator configured to receive the first waveguide section and a second insulator configured to receive the second waveguide section and is configured to allow a temperature of the sensor arrangement to drop along a length of the heat insulator between the first insulator and the second insulator.

6. The sensor arrangement according to claim 1, wherein the heat insulator is further configured to transmit the measurement signal within the heat insulator with the inner wall between the first waveguide section and the second waveguide section of the waveguide.

7. The sensor arrangement according to claim 1, wherein the heat insulator further comprises a connecter configured to secure the heat insulator to the first waveguide section and/or the second waveguide section.

8. The sensor arrangement according to claim 7, wherein the connecter is a spring connection or a snap connection.

9. The sensor arrangement according to claim 1, further comprising:

measurement electronics with a radar chip connected to the second waveguide section of the waveguide and configured to generate a measurement signal and/or to evaluate a measurement signal from the antenna.

10. A heat insulator for a sensor having an antenna and a waveguide, the heat insulator comprising:

a first insulator configured to receive a first waveguide section of the waveguide; and a second insulator configured to receive a second waveguide section of the waveguide, wherein the heat insulator is arranged to at least partially prevent heat conduction between the first waveguide section and the second waveguide section, wherein the heat insulator is tubular in shape and consists of a heat-insulating material, wherein the heat insulator has an inner wall which is at least partially metallized, and wherein the inner wall of the heat insulator corresponds to an inner wall of the waveguide when the first waveguide section is connected to the first insulator and/or when the second waveguide section is connected to the second insulator.

* * * * *